Patented Dec. 15, 1931

1,836,118

UNITED STATES PATENT OFFICE

HANS HEYNA AND ERWIN THOMA, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

AZO DYESTUFFS

No Drawing. Application filed August 1, 1928, Serial No. 296,858, and in Germany August 8, 1927.

The present invention relates to azo dyestuffs, more particularly to azo-dyes corresponding to the following general formula:

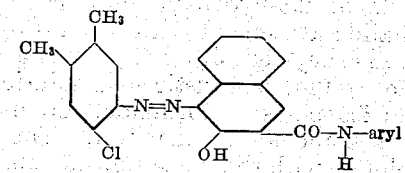

wherein aryl stands for an aryl group free from any solubilizing group, such as the $SO_2OH$ or the $COOH$ group.

Only a few aromatic amines are known which, when being used as diazo components and coupled with an arylamide of the 2-hydroxynaphthalene-3-carboxylic acid, yield azo dyestuffs which are not only of excellent fastness to kier-boiling but also of great fastness to light.

We have now found that the 1-amino-3.4-dimethylbenzene halogenated in 6 position yields dyestuffs which fully answer the above mentioned requirements as they are of good fastness to kier boiling and of eminent fastness to light. According to a statement contained in "Journal für Praktische Chemie 46, II, 34" Claus has already prepared 6-chlor-1-amino-3.4-dimenthylbenzene by transforming 6-chlor-3.4-dimethylphenyl-methylketoxim into the corresponding acetylchlorxylide and saponifying this acetyl compound. However the said compound can be obtained in an easier way by chlorinating the acetyl compound or the salts of 1-amino-3.4-dimethyl-benzene, or by substituting chlorine for the amino group in the 1-amino-3.4-dimethyl-6-nitrobenzene and reducing the nitro group.

The diazo compound of the said base, when coupled with the 5-chlor-2-methoxy-1-anilide or the 2-methoxy-1-anilide or the 2.5-dimethoxy-1-anilide of 2-hydroxynaphthalene-3-carboxylic acid, yields azo dyestuffs dyeing bright neutrally red to bluish-red tints of extremely good fastness to kier-boiling and to light.

The following examples serve to illustrate our invention but are not intended to limit it thereto; the parts being parts by weight unless otherwise stated.

(1) The cotton fiber is impregnated in the usual manner with the following grounding liquor: 4.5 parts of 2.3-hydroxynaphthoic acid-5'-chlor-2'-methoxy-1'-anilide are mixed with 9 parts by volume of Turkey-red oil of 50% strength, 9 parts of caustic soda solution of 34° Bé. and 4.5 parts of formaldehyde 30% and the whole is made up to one liter. For developing the color, the following diazo solution is used: 1.56 parts of 1-amino-2.4-dimethyl-6-chlorobenzene are diazotized with 2.6 parts by volume of hydrochloric acid of 22° Bé. and 0.72 parts of sodium nitrite dissolved in water, while cooling with ice. When the diazotation is complete, the mass is neutralized with 2 parts of sodium acetate, there are then added 20 parts of sodium chloride and the whole is made up to one liter. Thus there is produced on the material, after it has been washed and soaped at the boil, a bright bluish-red dyeing of excellent fastness to kier-boiling and an eminent fastness to light.

The dyestuff used in this example has probably the following constitution:

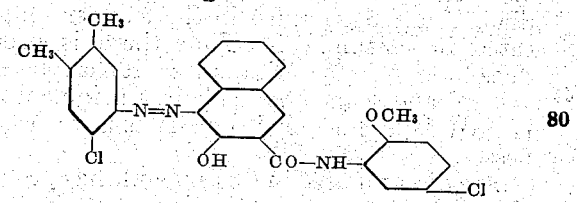

(2) The cotton fiber is treated in the usual manner with the following grounding liquor: 4.5 parts of 2.3-hydroxynaphthoic acid-4'-methoxy-1'-anilide are mixed with 9 parts by volume of Turkey-red oil of 50 per cent strength, 9 parts by volume of caustic soda solution of 34° Bé. and 4.5 parts of formaldehyde of 30% strength and the whole is made up with water to 1000 parts by volume. The developing operation is carried out with the diazo solution indicated in Example 1. Thus there is produced on the material, after it has been washed and soaped at the boil, a bright bluish-red dyeing of very good properties as to fastness.

The dyestuff used in this example has probably the following constitution:

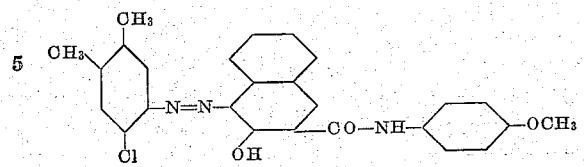

(3) The cotton fiber is treated in the usual manner with the following grounding liquor: 4.5 parts of the 4'-chlor-2'-methoxy-1'-anilide of 2.3-hydroxynaphthoic acid are mixed with 9 parts by volume of Turkey-red oil of 50% strength, 9 parts by volume of caustic soda solution of 34° Bé. and 4.5 parts by volume of formaldehyde of 30% and the whole is made up to one liter. The developing operation is carried out with the diazo solution obtained in the manner indicated in Example 1. Thus there is produced on the material, after it has been washed and soaped at the boil, a bright bluish-red dyeing of very good properties as to fastness.

The dyestuff used in this example has probably the following constitution:

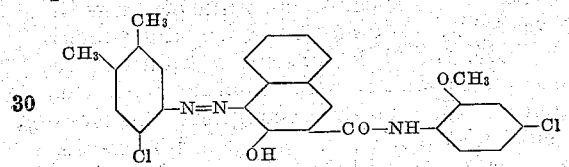

(4) The cotton fiber is padded in the usual manner with the following grounding liquor: 4.5 parts of 2.3-hydroxynaphthoic acid 2'-5'-dimethoxy-1'-anilide are mixed with 9 parts by volume of Turkey-red oil of 50% strength, 11.25 parts by volume of caustic soda solution of 34° Bé. and 4.5 parts of formaldehyde and the whole is made up to one liter. The color is developed with the diazo solution obtained in the manner indicated in Example 1. Thus there is produced on the material, after it has been washed and soaped at the boil, a bright bluish-red dyeing of good properties as to fastness.

The dyestuff used in this example has probably the following constitution:

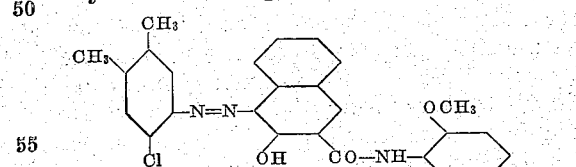

(5) The cotton fiber is padded in the usual manner with the following grounding liquor: 6 parts of 2.3-hydroxynaphthoic acid-2'-methoxy-1-anilide are mixed with 12 parts by volume of Turkey-red oil of 50% strength, 12 parts of caustic soda solution of 34° Bé., 6 parts by volume of formaldehyde of 30% and the whole is made up to one liter. The development of the color is carried out by means of the diazo solution in the manner indicated in Example 1. Thus there is produced on the material, after it has been washed and soaped at the boil, a bright scarlet-red dyeing of very good fastness to kier boiling.

The dyestuff used in this example has probably the following formula:

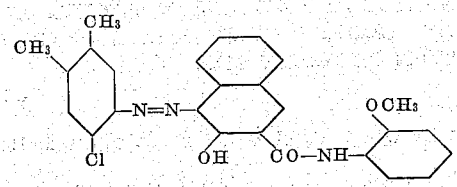

(6) The cotton fiber is treated in the usual manner with the following grounding liquor: 3.5 parts of 2.3-hydroxynaphthoic acid-2'-naphthalide are mixed with 5 parts by volume of Turkey-red oil of 50% strength, 7.5 parts by volume of caustic soda solution 34° Bé. and 2.5 parts of formaldehyde and the whole is made up to one liter. The color is developed with the diazo solution obtained in the manner indicated in Example 1. Thus there is produced on the material, after it has been washed and soaped at the boil, a bright red dyeing of good properties as to fastness.

The dyestuff used in this example has probably the following constitution:

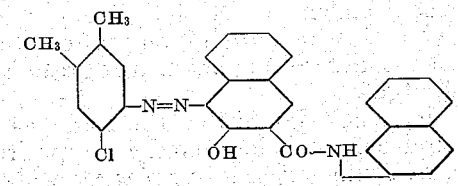

(7) The cotton fiber is padded in the usual manner with the following grounding liquor: 4.5 parts of 2.3-hydroxynaphthoic acid-1'-naphthalide are mixed with 9 parts by volume of sodium Turkey-red oil of 50% strength, 11.25 parts by volume of caustic soda solution of 34° Bé. and 4.5 parts of formaldehyde and the whole is made up to one liter. The color is developed with the diazo solution obtained in the manner indicated in Example 1. Thus there is produced on the material, after it has been washed and soaped at the boil a bluish-red dyeing of good fastness to light.

The dyestuff used in this example has probably the following constitution:

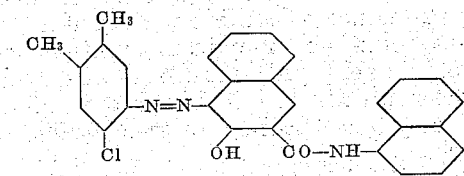

(8) The cotton fiber is treated in the usual manner with the following grounding liquor: 4.5 parts of 2.3-hydroxynaphthoic acid- 5'-chlor-2'-methyl-1'-anilide are mixed with 9 parts by volume of sodium Turkey red oil of 50% strength, 9 parts by volume of caustic soda solution of 34° Bé. and 4.5 parts by volume of formaldehyde and the whole is made up to one liter. The color is developed with the diazo solution obtained in the manner indicated in Example 1. Thus there is produced on the material, after it has been soaped at the boil, a bright red dyeing of good fastness to kier boiling and to light.

The dyestuff used in this example has probably the following constitution:

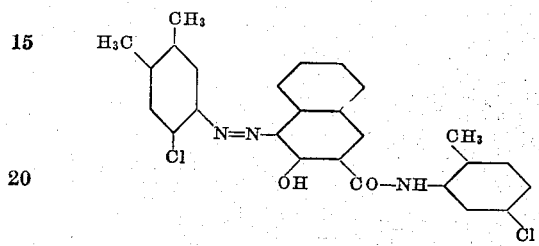

Since an object of the present invention is to provide dyestuffs of good fastness properties, it is to be understood that the aromatic nuclei of the general formulæ appearing in the appended claims contain no substituents as are known to render organic compounds soluble in water or alkalies and to tend to depreciate the fastness of the dyestuffs to alkalies. Substituents of this kind are, for instance, the sulfonic acid and the carboxylic acid group.

We claim:

1. As new products, the azo dyestuffs of the following general formula:

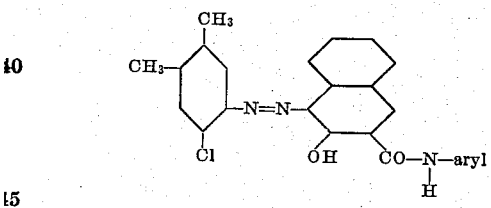

wherein aryl stands for a benzene or naphthalene residue which dyestuffs give on cotton bright bluish-red dyeings of very good properties as to fastness.

2. As new products, the azo dyestuffs of the following formula:

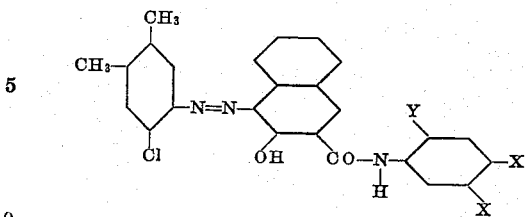

wherein X stands for hydrogen, chlorine or the $OCH_3$ group and Y represents hydrogen, methyl or the $OCH_3$ group, which dyestuffs give on cotton a bright bluish red dyeing of good fastness to kier boiling.

3. As new products, the azo dyestuffs of the following general formula:

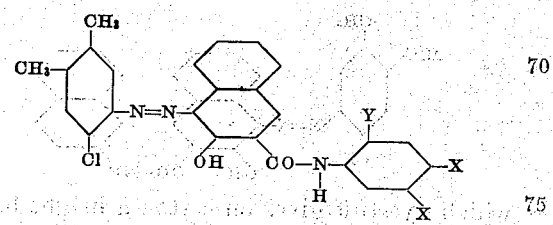

wherein one X stands for chlorine or the $O.CH_3$ group and the other X for hydrogen and Y stands for the methyl group $O.CH_3$ group or hydrogen, which dyestuffs give on cotton a bright bluish-red dyeing of excellent fastness to kier boiling and particularly good fastness to light.

4. As new products, the azo dyestuffs of the following formula:

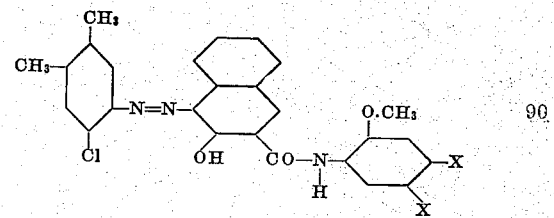

wherein one X stands for chlorine or the $O.CH_3$ group and the other X for hydrogen, which dyestuffs give on cotton a bright bluish-red dyeing of very good properties as to fastness.

5. As new products, the azo dyestuffs of the following formula:

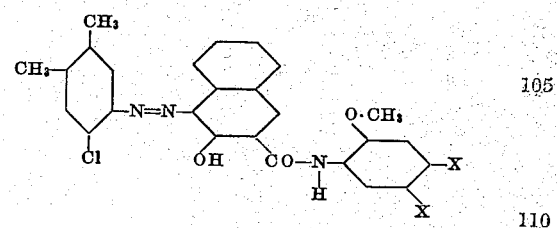

wherein one X stands for chlorine and the other X for hydrogen which dyestuffs give on cotton a bright bluish-red dyeing of good properties as to fastness.

6. As a new product, the azo dyestuff of the formula:

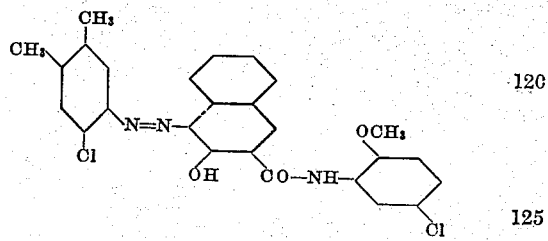

which dyestuff gives on cotton a bright bluish-red dyeing of excellent fastness to kier boiling and of particularly good fastness to light.

7. As a new product, the azo dyestuff of the formula:
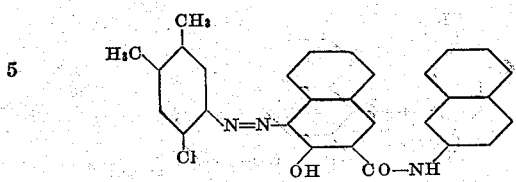
which dyestuff gives on cotton a bright bluish-red dyeing of good properties as to fastness.
In testimony whereof, we affix our signatures.
HANS HEYNA.
ERWIN THOMA.